United States Patent [19]

Eskeli

[11] 4,124,993
[45] Nov. 14, 1978

[54] REFRIGERATION MACHINE

[76] Inventor: Michael Eskeli, 7994-41 Locke Lee, Houston, Tex. 77042

[21] Appl. No.: 827,943

[22] Filed: Aug. 26, 1977

Related U.S. Application Data

[63] Continuation-in-part of Ser. No. 595,389, Jul. 14, 1975, Pat. No. 4,044,824, and a continuation-in-part of Ser. No. 825,701, Aug. 18, 1977.

[51] Int. Cl.$^2$ .............................................. F25B 9/00
[52] U.S. Cl. ...................................................... 62/86
[58] Field of Search ................ 62/401, 499, 500, 501, 62/502, 504, 506, 507, 86, 88; 165/86, 88

[56] References Cited

U.S. PATENT DOCUMENTS

| | | | |
|---|---|---|---|
| 2,788,644 | 4/1957 | Gustafsson | 62/499 |
| 2,981,082 | 4/1961 | Sixsmith | 62/401 |
| 3,470,704 | 10/1969 | Kantor | 62/499 |
| 3,828,573 | 8/1974 | Eskeli | 165/88 |
| 4,044,824 | 8/1977 | Eskeli | 62/401 |

FOREIGN PATENT DOCUMENTS

| | | | |
|---|---|---|---|
| 984,827 | 3/1976 | Canada | 62/499 |
| 633,985 | 6/1937 | Fed. Rep. of Germany | 165/86 |
| 979,936 | 1/1975 | United Kingdom | 62/401 |

*Primary Examiner*—Charles J. Myhre
*Assistant Examiner*—Sheldon Richter

[57] ABSTRACT

A method and apparatus for the generation of cooling or heating by using a centrifuge type heat exchanger wherein the refrigerant during heat addition undergoes a pressure increase. The apparatus where heat is added is a rotary heat exchanger with the refrigerant being within the heat exchanger and rotating with it, and the air which is releasing heat is outside of the heat exchanger in a stationary casing. Stationary or rotary heat exchanger may be used for heat rejection by the refrigerant. By reversing the air connections, one can also use the device for heating room air in air conditioning applications, while the air circulating around the heat exchanger is outside air. Refrigerant fluids for this device may be the usual fluids used for refrigeration, such as air, halogenated hydrocarbon, ammonia and others.

2 Claims, 4 Drawing Figures

REFRIGERATION MACHINE

CROSS REFERENCES TO RELATED INVENTIONS

This is a continuation-in-part application of "Heat Exchangers", filed July 14, 1975, Ser. No. 595,389, now U.S. Pat. No. 4,044,824. And this is a continuation-in-part application of "Heat Exchanger", filed Aug. 18, 1977, Ser. No. 825,701.

BACKGROUND OF THE INVENTION

This invention relates generally to refrigeration machines and heat pumps wherein a refrigerant is circulated in a process where the fluid is condensed and vaporized, with heat being transported from a lower temperature to a higher temperature.

In previous machines of this type, the vaporization is usually done at a constant pressure in an evaporator coil, and condensing is also done in a constant pressure coil. These machines generally have a poor thermal efficiency and use large amounts of power.

SUMMARY OF THE INVENTION

It is an object of this invention to improve the thermal efficiency of the refrigeration or heating process to reduce the power consumption of the machine.

DESCRIPTION OF PREFERRED EMBODIMENTS

Figure 1:
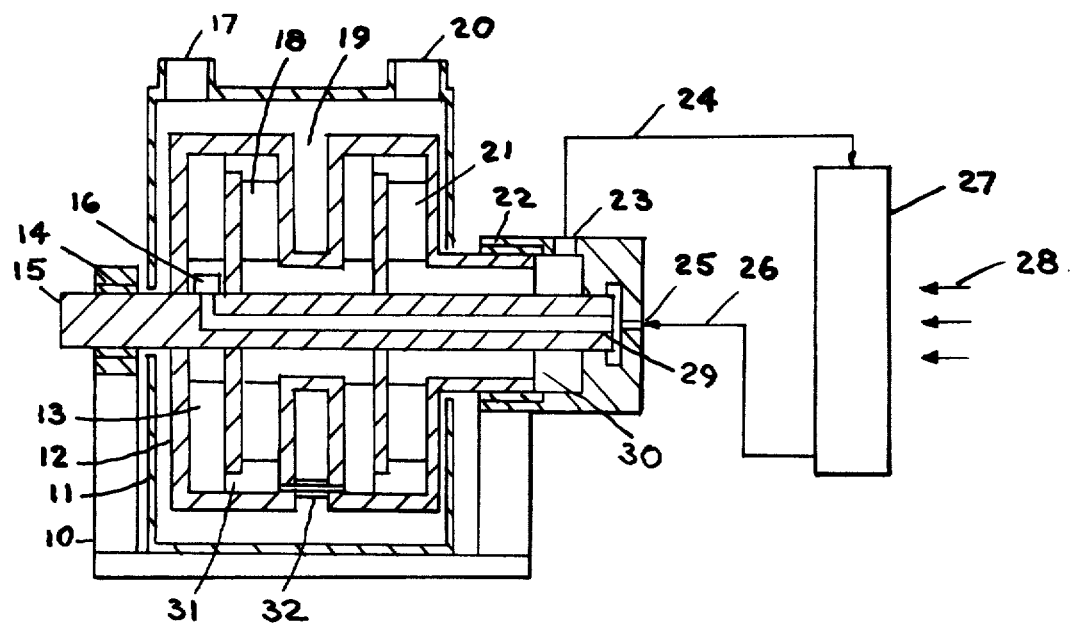
FIG. 1 is a cross ection of the apparatus, with emphasis on the evaporation part of the machine.

Referring to FIG. 1, therein is shown a cross section of the evaporation portions of the unit, and the condenser coil and connecting conduits are shown schematically. 10 is base, 11 is air shell, 12 is rotor, 13 is outward extending passage, 14 is shaft bearing, 15 is shaft, 16 is expansion device, usually a valve or a capillary tube, 17 and 20 are air outlet and inlet respectively, 18 is inwardly extending refrigerant passage, 19 is air space for transferring heat to the refrigerant fluid, 21 is inwardly extending passage, 22 is bearing and seal, 23 is gas discharge from rotary part, 24 is conduit to condenser coil 27, 28 indicates air passing through the condenser coil, 25 is liquid inlet to shaft passage, 26 is liquid line, 29 is shaft liquid passage, 30 is gas exit from rotor, and 31 is peripheral passage, which may be a set of nozzles if desired.

Figure 2:
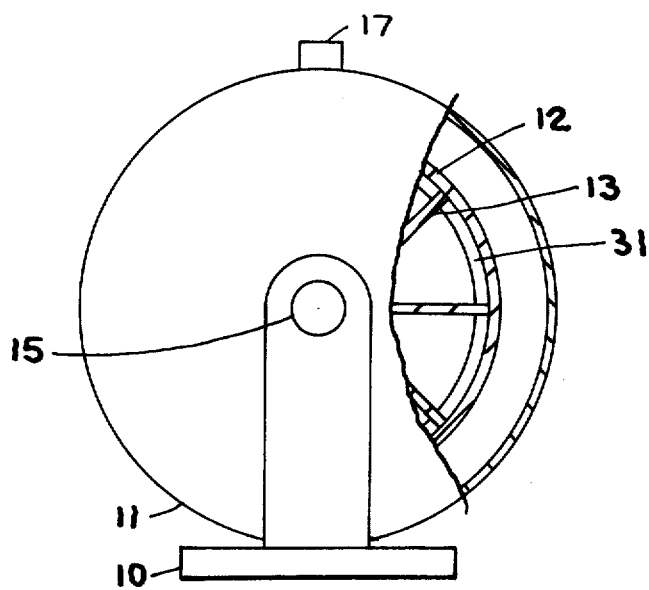
FIG. 2 is an end view of the machine.

In FIG. 2 an end view of the condensing portion is shown. 10 is base, 11 is air shell, 15 is shaft, 12 is rotor, 13 is vane in outwardly extending fluid passage, 31 is peripheral passage.

Figure 3:
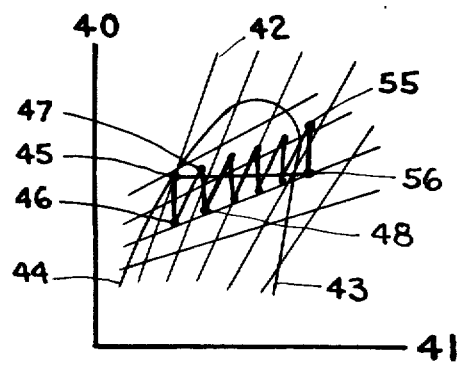
FIG. 3 is a pressure-enthalpy or internal energy diagram for the unit work cycle.

In FIG. 3, a pressure-enthalpy or internal energy diagram is shown for the refrigerant together with a work cycle. 40 is pressure line, 41 is enthalpy or internal energy line, 42 is entropy line. Expansion in an expansion valve is indicated by line 45-46, and the several compression-expansion steps with heat addition are shown by 46-47-48 to 55-56. The pressure at point 56 may be approximately the same as at point 45. Line 56-45 represents the constant pressure heat removal in the condenser coil; such heat removal may be at a varying pressure also, if desired. 44 and 43 are the saturated liquid and saturated vapor lines. Note that the gas is gaining in pressure during heat addition from point 46 to point 56; such pressure gain is sually sufficient without work addition to the refrigerant from the shaft; work can be added from shaft, if desired, or where the heat addition pressure gain is insufficient by itself.

Figure 4:
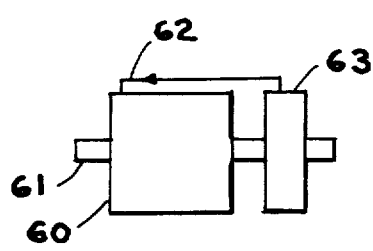
FIG. 4 is a schematic showing all parts on a single unit.

In FIG. 4, a method is shown to provide for passing the liquid from the discharge of the condenser to the start of the evaporator, where the condenser is mounted on same shaft with the evaporator and rotates with it. Such arrangement makes possible to have the apparatus hermetic, without gas seals such as item 22 in FIG. 1. 60 is the evaporator portion of the rotor, 63 is the condensing portion of the rotor, the two usually mounted on a common shaft, 61 is shaft, and 62 is liquid line from the condenser to evaporator, passing usually within the rotors but shown here outside the rotors for clarity. The liquid is taken from the condenser space periphery, and passed to the evaporator portion periphery, with an expansion valve, or other expansion device to provide for the usual expansion service for the refrigerant. Shaft 61 is mounted on suitable bearings and base, and caused to rotate, and air is passed over the condensing coil in the usual manner.

In operation, the rotor is caused to rotate, and the refrigerant enters the outwardly and inwardly extending passages via liquid passage and valve 16. The liquid is evaporated by adding heat in the several compression-expansion steps, by adding heat from rotor exterior through heat conductive walls. Liquid will usually pass to rotor periphery, and the part that is not vaporized in the first compression-expansion step, can pass to the next step through veep holes and conduits such as item 32 in FIG. 1. The vapor gains in pressure within the several steps mainly due to heat addition during each expansion step. After the gas has been pressurized and heated and vaporized, it passes to the condenser where it is condensed by removing heat, and the liquid is then passed to the rotary evaporator portion, thus completing its cycle. The air to be cooled, is entering via entry 20 and passes in counterflow around the rotor, and exits then via exit 17, and is the refrigerated air. The air passing through the condenser is heated, and can serve as the heated air. Thus, the machine can be used as a heat pump by simply switching the air flows to the space to be conditioned, and outside air. The machine also circulates its refrigerant, as described.

The main advantage of this apparatus when compared with currently used standard refrigeration machines, is in reduced power consumption. The pressure gain for the fluid being heated, which is the refrigerant fluid, within the rotor, is nearly work free, with the pressure gain being a consequence of the heat addition. For work free operation, the outwardly and inwardly extending fluid passages within the rotor are made of same radial length, so that work added during each compression step is the same as the work recovered during each expansion step. Obviously such radial passages can be also of differing lengths, as desired, with resulting changes in the work quantities. Usually, numerous compression-expansion steps are used, to reduce the required rotor rotational speeds; two such steps are shown in FIG. 1. By using sufficient number of steps, a suitable pressure gain is obtained, and additional pressure can be provided by using some shaft work with suitably arranging the vanes in the radial passages by curving them and changing their radial length.

The portion indicated by 63 in FIG. 4, may be made of similar construction as the evaporator portion, or it may be a fin and tube type rotor.

Applications of this device include the usual for air conditioning heating and refrigeration.

The sheet metal shell, item 11, may be attached to rotate with the rotor, if desired. Such rotation would reduce windage losses on the rotor to some extend, as the outer surface of the shell 11 is smooth.

The temperature of the working fluid is increased during the compression-expansion steps in the evaporating portion, generally from step to step. The liquid tubes, item 32, are made to allow the passage of unvaporized liquid, but are made small enough to prevent the passage of significant amounts of gas. The outward extending passages in the evaporator portion are made usually to be restricted for the tangential movement of the fluid, while the inwardly extending passages are wider in the tangential direction to allow some tangential movement and turbulence. The vanes in the radial passages may be also curved if desired.

Thermal insulation may be provided as desired. Such insulation may be desirable to prevent heat addition to the fluid during compression. Also, the stationary shell may be insulated.

The heat addition into the working fluid may be also from a liquid circulated in heat exchange relationship with the working fluid in passages such as 18. The heat exchanger may then be finned tubing mounted within the rotor and supplied with a liquid heat transfer fluid from external sources via shaft passages. Usually, such liquid would pass in succession first through heat exchanger in passage 21 and then through heat exchanger in passage 18, with its temperature reduced as it passes from one step to next, in what is known as counterflow. Simultaneously, the working fluid would get warmer from step to step. Thus, this evaporation device can be used also to provide chilled water. Similarly, the condenser heat exchanger can be provided with a liquid heat transfer fluid; thus, heated water can be produced by the machine.

I claim:

1. A thermodynamic method comprising:
   a. passing a fluid through a pressure reducing expansion valve;
   b. subsequently vaporizing said fluid in a continuously rotating evaporator-compressor comprising alternate compression-expansion steps with simultaneous addition of heat and accompanying pressure increase.

2. The thermodynamic method of claim 1 wherein said fluid subsequent to the vaporizing is condensed by removing heat from said fluid.

* * * * *